United States Patent
Han (10) Patent No.: US 8,687,707 B2
(45) Date of Patent: Apr. 1, 2014

(54) METHOD AND APPARATUS FOR ENCODING/DECODING USING EXTENDED MACRO-BLOCK SKIP MODE

(75) Inventor: Woo-jin Han, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1800 days.

(21) Appl. No.: 11/703,694

(22) Filed: Feb. 8, 2007

(65) Prior Publication Data
US 2007/0230575 A1 Oct. 4, 2007

Related U.S. Application Data

(60) Provisional application No. 60/788,732, filed on Apr. 4, 2006.

(30) Foreign Application Priority Data

Jul. 14, 2006 (KR) ................ 10-2006-0066410

(51) Int. Cl.
*H04N 7/12* (2006.01)

(52) U.S. Cl.
USPC ............ 375/240.26; 375/240.16; 375/240.23; 382/236

(58) Field of Classification Search
USPC .................................................. 375/240.26
See application file for complete search history.

(56) References Cited

U.S. PATENT DOCUMENTS

2002/0001411 A1* 1/2002 Suzuki et al. ............... 382/238
2006/0013302 A1 1/2006 Bao et al.
2006/0133503 A1* 6/2006 Park et al. ............... 375/240.16
2007/0230564 A1 10/2007 Chen et al.
2010/0158135 A1 6/2010 Yin et al.

FOREIGN PATENT DOCUMENTS

| JP | 2009512342 A | 3/2009 |
| JP | 2009531999 A | 9/2009 |
| WO | 2006006777 A1 | 1/2006 |

OTHER PUBLICATIONS

Choi et al., "Efficient entropy coding for scalable video coding", Proc. of SPIE vol. 6015, 2005.*
Li, H., Li, Z., Changyun, W., & Chau, L.-P. (2006). Fast Mode Decision for Spatial Scalable Video Coding. IEEE, 3005-3008.*
Wiegand, T., Sullivan, G. J., Bjontegaard, G., & Luthra, A. (2003). Overview of the H.264/AVC Video Coding Standard. IEEE, 560-576.*
Schwarz, H., Marpe, D., & Wiegand, T. (2004). SNR-Scalable Extension of H.264/AVC. IEEE, 3113-3116.*
Office Action dated Jun. 21, 2011, issued by the Japanese Patent Office in counterpart Japanese Application No. 2009-504116.

\* cited by examiner

*Primary Examiner* — Mohammad L Rahman
(74) *Attorney, Agent, or Firm* — Sughrue Mion, PLLC (57) ABSTRACT

A method is provided for encoding a multi-layer video signal by using an extended macro-block skip mode. The method includes generating a bit stream of a base layer; generating a bit stream of an enhanced layer by referring to a frame of the base layer; setting a syntax item for an extended macro-block skip mode in an area of the bit stream of the enhanced layer, wherein the syntax item indicates if information of the base layer is used as it is while a frame of the enhanced layer is skipped.

31 Claims, 9 Drawing Sheets

<WHEN BL INFO IS NOT USED (MB_skip_mode_type = 0)>

<WHEN ALL BL INFO IS USED (MB_skip_mode_type = 1)>

FIG. 6

<WHEN ALL BL INFO IS USED> 610

| Base_mode_flag | Motion_prediction_flag | Residual_prediction_flag |
|---|---|---|
| 1 | 1 | 1 |

<WHEN ONLY MOTION INFO OF BL IS USED> 620

| Base_mode_flag | Motion_prediction_flag | Residual_prediction_flag |
|---|---|---|
| 0 | 1 | 0 |

<WHEN ONLY RESIDUAL INFO OF BL IS USED> 630

| Base_mode_flag | Motion_prediction_flag | Residual_prediction_flag |
|---|---|---|
| 0 | 0 | 1 |

<WHEN BL INFO IS NOT USED AT ALL> 640

| Base_mode_flag | Motion_prediction_flag_lx | Residual_prediction_flag |
|---|---|---|
| 0 | 0 | 0 |

METHOD AND APPARATUS FOR ENCODING/DECODING USING EXTENDED MACRO-BLOCK SKIP MODE

CROSS-REFERENCE TO RELATED APPLICATION

This application claims priority from Korean Patent Application No. 10-2006-0066410 filed on Jul. 14, 2006 in the Korean Intellectual Property Office, and U.S. Provisional Patent Application No. 60/788,732 filed on Apr. 4, 2006 in the United States Patent and Trademark Office, the disclosures of which are incorporated herein by reference in their entirety.

BACKGROUND OF THE INVENTION

1. Field of the Invention

Methods and apparatuses consistent with the present invention relate to video compression technology, and more particularly, to encoding/decoding using an extended macroblock skip mode, which performs inter-layer prediction by selectively using information of a base layer according to the type of the extended macro-block skip mode, wherein the type indicates if the information of the base layer is used as it is while skipping a frame of an enhanced layer in a multi-layer video signal.

2. Description of the Related Art

In related art information communication technologies including the Internet, multimedia services capable of supporting various types of information such as text, image and music are increasing. Multimedia data usually have a large volume, which requires a large capacity medium for storage of data and a wide bandwidth for transmission of data. Therefore, a compression coding scheme is required to transmit multimedia data including text, image, and audio data.

Data compression lies includes a process of removing redundancy in data. Data compression can be achieved by removing the spatial redundancy such as repetition of the same color or entity in an image, the temporal redundancy such as repetition of the same sound in audio data or nearly no change between temporally adjacent pictures in a moving image stream, or the perceptual redundancy based on human visual and perceptional capability being insensitive to high frequencies. Data compression can be classified into loss/no-loss compression according to whether the source data is lost, in-frame/inter-frame compression according to whether the compression is independent for each frame, and symmetric/non-symmetric compression according to whether time necessary for the compression and restoration is the same. In related art video coding schemes, temporal repetition is removed by temporal filtering based on motion compensation and spatial repetition is removed by spatial transform.

Transmission media, which are necessary to transmit multimedia data generated after redundancies in the data are removed, show various levels of performance. Related art transmission media include media having various transmission speeds, from an ultra high-speed communication network capable of transmitting several tens of megabits of data per second, to a mobile communication network having a transmission speed of 384 kilobits per second. In such an environment, the scalable video coding scheme, that is, a scheme for transmitting the multimedia data at a data rate according to the transmission environment or to support transmission media of various speeds, is more suitable for the multimedia environment.

In a broad sense, the scalable video coding includes a spatial scalability for controlling a resolution of a video, a Signal-to-Noise Ratio (SNR) scalability for controlling a screen quality of a video, a temporal scalability for controlling a frame rate, and combinations thereof.

Standardization of the scalable video coding as described above is disclosed in Moving Picture Experts Group-21 (MPEG-4) part 10. To arrange the standardization of the scalable video coding, related art efforts have been attempted to implement scalability on a multi-layer basis. For example, the scalability may be based on multiple layers including a base layer, a first enhanced layer (enhanced layer 1), a second enhanced layer (enhanced layer 2), etc., which have different resolutions (QCIF, CIF, 2CIR, etc.) or different frame rates.

As is the case in related art coding with a single layer, it is necessary to obtain a motion vector (MV) for removing the temporal redundancy for each layer in the coding with multi-layers. The motion vector includes a motion vector (former), which is individually obtained and used for each layer, and a motion vector (latter), which is obtained for one layer and is then also used for other layers (either as it is or after up/down sampling). It is possible to obtain a more exact motion vector in the former case than in the latter case. However, the motion vector obtained for each layer may instead serve as an overhead. Therefore, in the former case, the redundancy between the motion vectors of the respective layers should be substantially eliminated.

Figure 1:
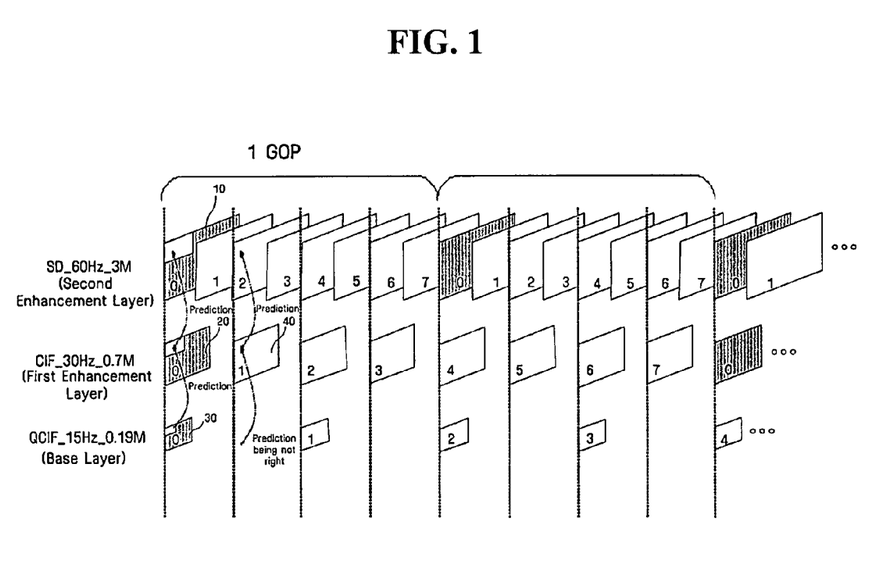
FIG. 1 is a view illustrating a scalable video codec using a multi-layer structure.

FIG. 1 is a view illustrating a scalable video codec using a multi-layer structure. First, a base layer is defined to have a frame rate of Quarter Common Intermediate Format (QCIF)–15 Hz, a first enhanced layer is defined to have a frame rate of Common Intermediate Format (CIF)–30 Hz, and a second enhanced layer is defined to have a frame rate of Standard Definition (SD)–60 Hz. If a CIF 0.5 Mbps stream is required, it is possible to cut and transmit the bit stream so that the bit rate is changed to 0.5 Mbps in CIF__30 Hz__0.7 Mbps of the first enhanced layer. In this way, the spatial, temporal, and SNR scalability can be implemented.

As noted from FIG. 1, frames 10, 20, and 30 of respective layers having the same temporal position may have similar images. Therefore, there is a related art scheme in which a texture of a current layer is predicted from a texture of a lower layer either directly or through up-sampling, and a difference between the predicted value and the texture of the current layer is encoded. In "Scalable Video Model 3.0 of ISO/IEC 21000-13 Scalable Video Coding (hereinafter, referred to as SVM 3.0)," the scheme as described above is defined as an "Intra_BL prediction."

As described above, the SVM 3.0 employs not only the "inter-prediction" and the "directional intra-prediction," which are used for prediction of blocks or macro-blocks constituting a current frame in the related art H.264, but also the scheme of predicting a current block by using a correlation between a current block and a lower layer block corresponding to the current block. This related art prediction scheme is called "Intra_BL prediction," and an encoding mode using this prediction is called "Intra_BL mode."

Figure 2:
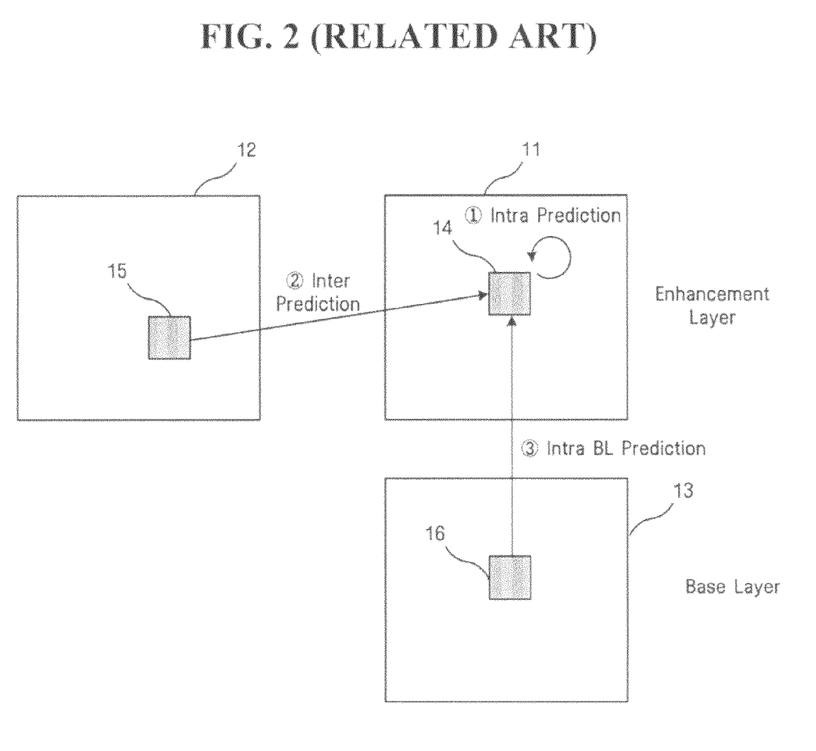
FIG. 2 is a schematic view for illustrating three related art prediction schemes in a scalable video codec.

FIG. 2 is a schematic view for illustrating the three related art prediction schemes described above, which include an intra-prediction (①) for a certain macro-block 14 of a current frame 11, an inter-prediction (②) using a macro-block 15 of a frame 12 located at a position temporally different from that of the current frame 11, and an intra_BL prediction (③) using texture data for an area 16 of a base layer frame 13 corresponding to the macro-block 14. In the scalable video coding standard as described above, one advantageous scheme is selected and used from among the three prediction schemes for each macro-block.

A macro-block skip mode has been employed in the related art in the enhanced layer of the scalable video coding as described above and is being used in the coding of a static motion sequence. Originally, the macro-block skip mode was not designed for the scalable video coding and has been used in the related art H.264, and can be considered as having been borrowed for the scalable video coding. To apply the macro-block skip mode of the H.264, the Coded Block Pattern (CBP) must have a value of 0, which means there is no data to be predicted. Therefore, in order to apply the macro-block skip mode of the H.264, the value of the residual prediction flag (residual_pred_flag) must be set to 0.

When the macro-block skip mode is applied in this way, a motion vector and pattern information of a macro-block to be encoded are skipped, and instead a motion vector and pattern information of another macro-block adjacent to the macro-block are taken and encoded. Then, they are expressed by a flag of one bit.

However, according to the related art macro-block skip mode employed in the scalable video coding, it is possible to apply the skip mode only to the base layer and each of the enhanced layers, and it is impossible to use an extended macro-block skip mode for extending the macro-block skip mode to the inter-layers by using a flag of one bit.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for encoding/decoding using an extended macro-block skip mode, which can extend the macro-block skip mode, which is employed in the related art H.264, through a scalable video coding, so that it is possible to perform prediction by means of information of a base layer while skipping a frame of an enhanced layer.

According to an aspect of the present invention, there is provided a method of encoding a multi-layer video signal by using an extended macro-block skip mode, the method including generating a bit stream of a base layer; generating a bit stream of an enhanced layer by referring to a frame of the base layer; setting a syntax item for an extended macro-block skip mode in a predetermined area of the bit stream of the enhanced layer, wherein the syntax item indicates if information of the base layer is used as it is while a frame of the enhanced layer is skipped.

The method further may include selectively using the information of the base layer according to the type of the extended macro-block skip mode.

According to another aspect of the present invention, there is provided a method of decoding a multi-layer video signal by using an extended macro-block skip mode, the method including extracting a syntax item for an extended macro-block skip mode from a predetermined area of an input enhanced layer bit stream; restoring a frame of the base layer from an input base layer bit stream; restoring a frame of the enhanced layer by using the restored frame of the base layer and the extracted syntax item, wherein the syntax item indicates if the frame of the enhanced layer has been skipped during an encoding process.

According to still another aspect of the present invention, there is provided an encoder for encoding a multi-layer video signal by using an extended macro-block skip mode, the encoder including a base layer generator generating a bit stream of a base layer; an enhanced layer generator generating a bit stream of an enhanced layer by referring to a frame of the base layer; a syntax item setup unit setting a syntax item for an extended macro-block skip mode in a predetermined area of the bit stream of the enhanced layer, wherein the syntax item indicates if information of the base layer is used as it is while a frame of the enhanced layer is skipped.

The encoder may further include a base layer information using unit selectively using the information of the base layer according to the type of the extended macro-block skip mode.

According to yet another aspect, there is provided a decoder for decoding a multi-layer video signal by using an extended macro-block skip mode, the decoder including a syntax item extractor extracting a syntax item for an extended macro-block skip mode from an area of an input enhanced layer bit stream; a base layer restorer restoring a frame of the base layer from an input base layer bit stream; an enhanced layer restorer restoring a frame of the enhanced layer by using the restored frame of the base layer and the extracted syntax item, wherein the syntax item indicates if the frame of the enhanced layer has been skipped during an encoding process.

According to yet another aspect of the present invention, there is provided a bit stream construction of an enhanced layer, the bit stream construction including a slice header area including information about the type of the extended macro-block skip mode, which indicates if information of a base layer is used as it is while a frame of the enhanced layer is skipped; and a slice data area including residual information and motion information of a frame of the base layer, wherein the slice header area and the slice data area are included in the frame of the enhanced layer.

BRIEF DESCRIPTION OF THE DRAWINGS

The above and other aspects will be more apparent from the following detailed description of exemplary embodiments taken in conjunction with the accompanying drawings, in which.

DETAILED DESCRIPTION OF THE EXEMPLARY EMBODIMENTS

Advantages and features of the present invention, and ways to achieve them will be apparent from exemplary embodiments of the present invention as will be described below together with the accompanying drawings. However, the scope of the present invention is not limited to such exemplary embodiments, and the present invention may be realized in various forms. The exemplary embodiments to be described below assist those skilled in the art to completely understand the present invention. The present invention is defined only by the scope of the appended claims. Also, the same reference numerals are used to designate the same elements throughout the specification.

Hereinafter, exemplary embodiments of the present invention will be described with reference to block diagrams or flowcharts for illustrating an encoding/decoding method and apparatus using a pre-defined extended macro-block skip mode according to the present invention.

As used herein, a base layer refers to a video sequence which has a frame rate lower than the maximum frame rate of a bit stream actually generated in a scalable video encoder and a resolution lower than the maximum resolution of the bit stream. In other words, the base layer may have a frame rate and a solution, which are lower than the maximum frame rate and the maximum resolution, and the base layer need not have the lowest frame rate and the lowest resolution of the bit stream. However, the following description is based on an assumption that the base layer has the lowest frame rate and the lowest resolution.

Figure 3:
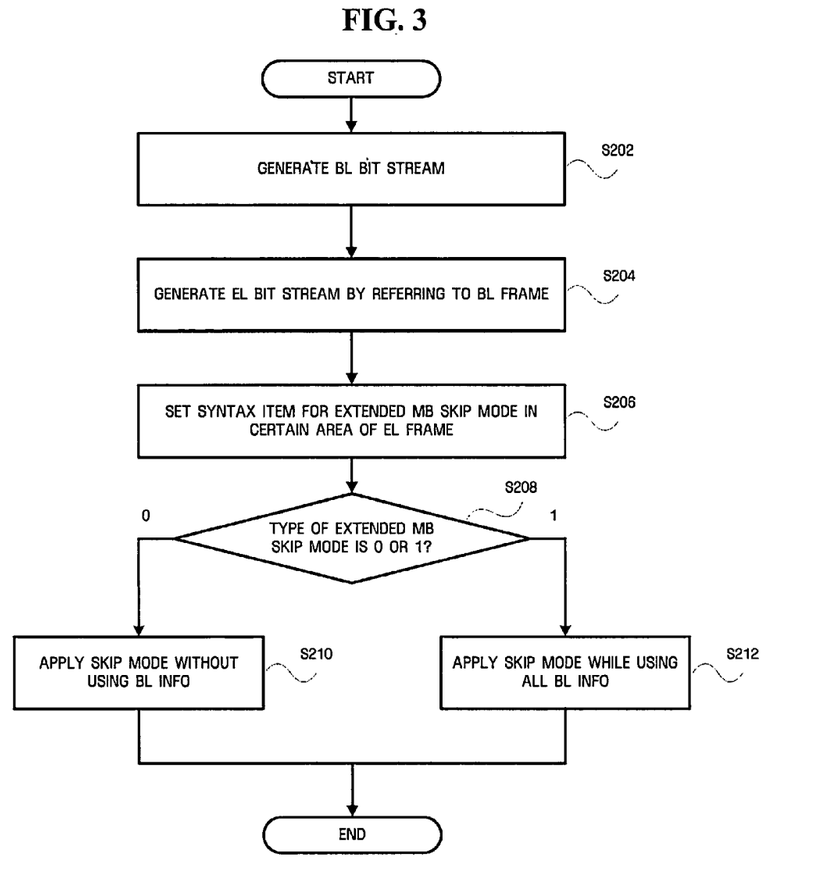
FIG. 3 is a flowchart illustrating the entire process of an encoding method using an extended macro-block skip mode according to an exemplary embodiment of the present invention.

FIG. 3 is a flowchart illustrating the entire process of an encoding method using an extended macro-block skip mode according to an exemplary embodiment of the present invention.

First, a bit stream of a base layer is generated from data input to an encoder of the base layer (operation S202). Then, an enhanced layer generates a bit stream of the enhanced layer with reference to the frame input to the encoder of the base layer (operation S204). The process of generating the bit stream of the base layer and the bit stream of the enhanced layer has is known in related art multi-layer video signal encoding and will not be further described in detail.

Meanwhile, a new syntax item for indicating the type of an extended macro-block skip mode obtained by extending the macro-block skip mode through a multi-layer video encoding is set in an area of a slice or frame of the enhanced layer input to the encoder of the enhanced layer (operation S206). The extended macro-block skip mode indicates whether it is possible to use the information of the base layer as it is while skipping the enhanced layer frame, and can be implemented by the syntax item which can be expressed by the flag of one bit. The skip mode refers to a scheme according to a agreement between an encoder and a decoder, which transmits only a skip flag of one bit without transmitting information of a corresponding macro-block to be coded, when there is a redundancy in the macro-block information between frames.

Hereinafter, a process of performing the inter-layer prediction by selectively using information of the base layer according to the type of the extended macro-block skip mode will be described. In the following description, the area of the frame or slice corresponds to a header area of the slice constituting the frame of the enhanced layer, and the syntax item for determining the type of the extended macro-block skip mode set in the header area is expressed as "MB_skip_mode_type."

Because the type (MB_skip_mode_type) of the extended macro-block skip mode has a value of either 0 or 1, it is determined if the type of the extended macro-block skip mode has a value of 0 or 1 (operation S208). If the type has a value of 0, the slice is skipped while never using the information of the base layer (operation S210). However, if the type has a value of 1, the slice is skipped while using all the information of the base layer (operation S212). The information of the base layer includes both the motion information and the residual information of the frame existing in the base layer. Hereinafter, a scheme of referring to the motion information and the residual information of the base layer will be described in more detail with reference to FIG. 5.

Figure 5:
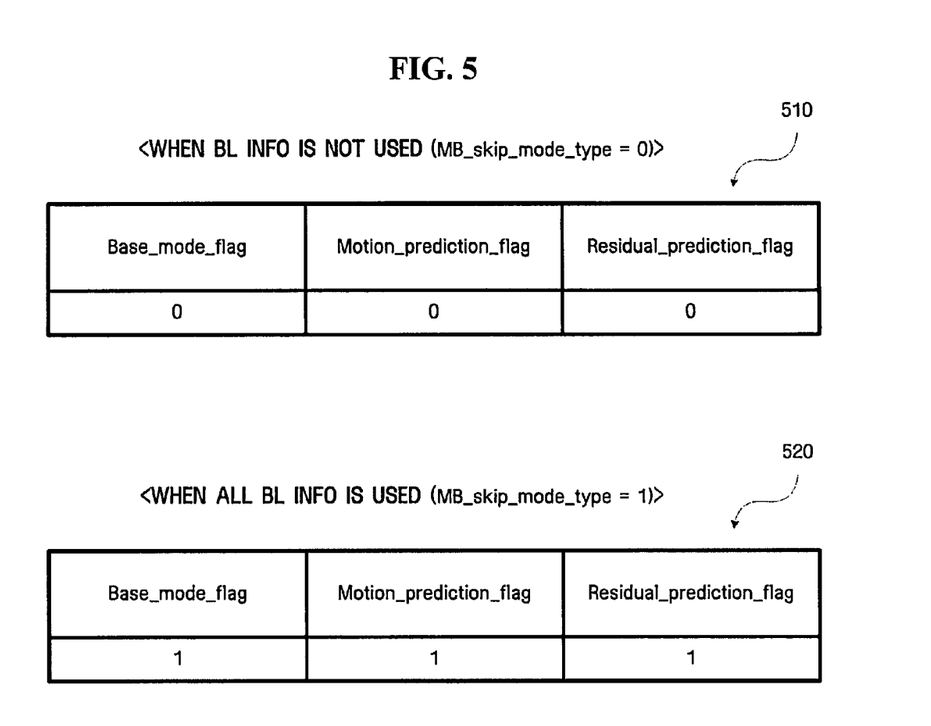
FIG. 5 illustrates tables of two cases, which indicate if the information of the base layer is referred to according to the type of the extended macro-block skip mode.

FIG. 5 illustrates tables of two cases, which indicate if the information of the base layer is referred to according to the type of the extended macro-block skip mode. Hereinafter, the relation between the extended macro-block skip mode and the flags shown in the tables will be discussed.

In order to use the prediction process described above with reference to FIG. 2 in the decoder, the decoder sets information about the type of an executed prediction and the referred data and receives the setup information from the encoder. The information for transmitting the prediction scheme of FIG. 2 to the decoder includes a scheme for prediction with reference to the information of the base layer. For example, it is possible to perform prediction by referring to the residual information of the base layer or the motion vector of the base layer. Therefore, there are flags for indicating the referred information of the base layer for the prediction, representatives of which include a residual prediction flag (Residual_prediction_flag), a motion prediction flag (Motion_prediction_flag), and a base mode flag (Base_mode_flag). By combination of such flags, it is possible to set the macro-block skip mode, and it is thus possible to selectively use the information of the base layer.

Referring to FIG. 5, when the MB_skip_mode_type has a value of 0 as in table 510, only the pattern information and motion information of the neighbor macro-blocks of the same layer are taken and used, while the information of the base layer is never used. The Residual_prediction_flag indicates whether to skip the residual information, the Motion_prediction_flag indicates whether to skip the motion information, and the Base_mode_flag indicates both the information indicated by the Residual_prediction_flag and the information indicated by the Motion_prediction_flag and is a flag indicating general information about the base layer.

As shown from table 510, when all the three flags have a value of 0, the existing coding process is performed while never using the residual information and motion information of the base layer at all.

However, when the MB_skip_mode_type has a value of 1 as shown in table 520, all the information of the base layer is taken and used. That is, when both the Motion_prediction_flag and the Residual_prediction_flag have a value of 1 and the Base_mode_flag accordingly has a value of 1, both the residual information and the motion information are taken and used from the base layer. Therefore, only the flags are set to 1 and then transmitted to the decoder without coding any other information about the corresponding slice to be encoded. Because the flags as described above carry information set for each frame, slice, or macro-block, it is possible to reduce the side of the flags or increase the compression efficiency in the coding.

An extended macro-block skip mode using the inter-layer prediction is employed in the multi-layer video encoding at least because all of the residual information and the motion information of the enhanced layer frame corresponding to the base layer frame can be omitted when a target bit rate is low in transmission of the scalable bit stream to the decoder. Therefore, the enhanced layer uses the residual information and the motion information of a base layer frame corresponding to the enhanced layer.

The residual information refers to a frame generated by a temporally differential coding or difference coding and relates to the residual prediction. The residual prediction refers to a prediction performed once again for residual data which are a residual result obtained from the prediction schemes described with reference to FIG. 2. The motion information includes a motion vector, a reference frame number, a block size, or the like, and relates to the motion prediction. The motion prediction refers to prediction of a motion vector of the enhanced layer by referring to the motion vector of the base layer.

According to another exemplary embodiment of the present invention, the type (MB_skip_mode_type) of the extended macro-block skip mode set in the slice header area can be classified into four types instead of two types, which will be described hereinafter with reference to FIG. 6, which illustrates tables of four cases indicative of whether information of the base layer is referred to according to the type of the extended macro-block skip mode.

First, when the Base_mode_flag has a value of 1 as in table 610, both the Motion_prediction_flag and the Residual_prediction_flag have a value of 1, and both the motion information and the residual information are taken and used for the inter-layer prediction as in the case of table 510 described above.

Further, the case in which the Base_mode_flag has a value of 0 can be classified into tables 620, 630, and 640. When the Base_mode_flag has a value of 0, the Motion_prediction_flag has a value of 1, and the Residual_prediction_flag has a value of 0, as in table 620 of FIG. 6, only the motion information is taken from the base layer and used, while the residual information is subjected to the related art coding process through the intra-prediction or the intra-BL prediction.

Figure 6:
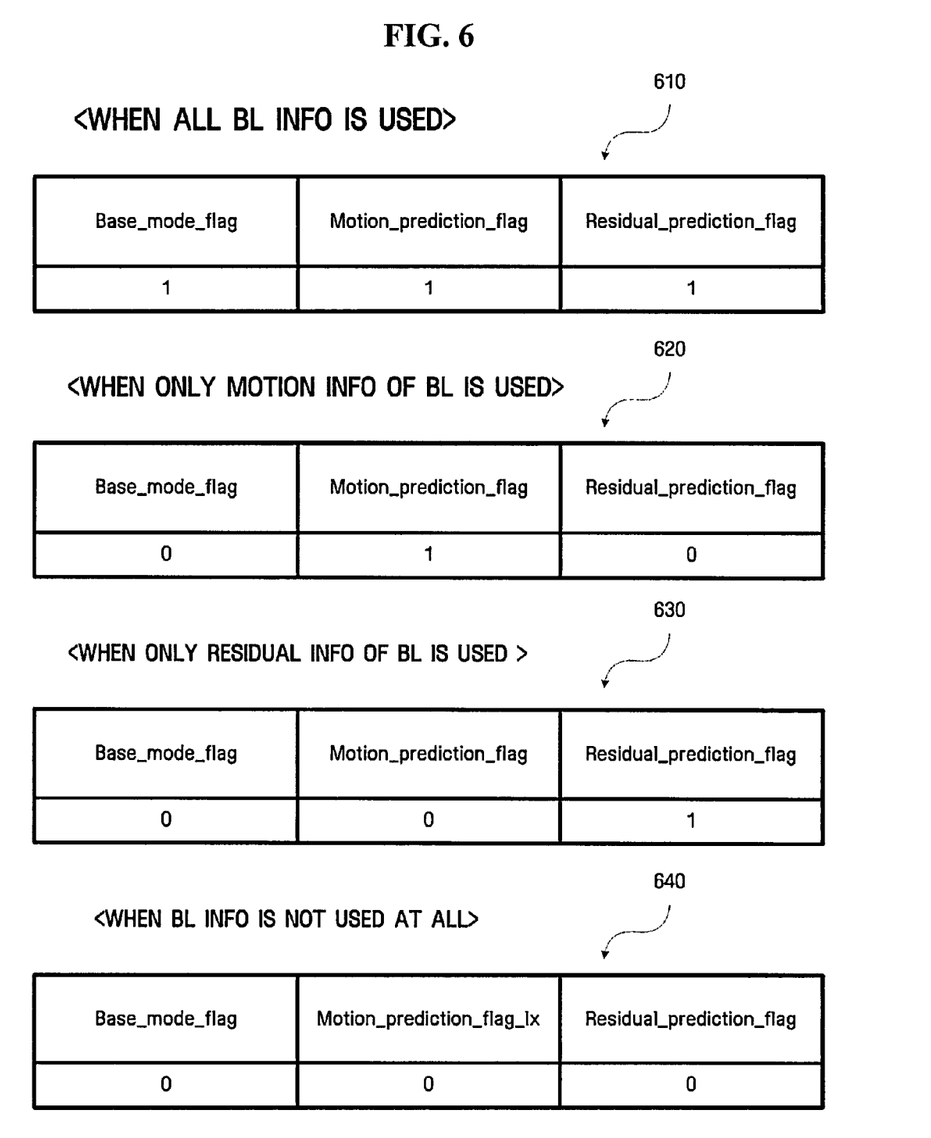
FIG. 6 illustrates tables of four cases, which indicate if the information of the base layer is referred to according to the type of the extended macro-block skip mode.

When the Base_mode_flag has a value of 0, the Motion_prediction_flag has a value of 0, and the Residual_prediction_flag has a value of 1, as in table 630 of FIG. 6, only the residual information of the frame existing in the base layer is taken while the motion information is subjected to the related art coding.

When both the Motion_prediction_flag and the Residual_prediction_flag have a value of 0 and the Base_mode_flag accordingly has a value of 0, as in table 640 of FIG. 6, both the residual information and the motion information are not taken from the base layer as in the case of table 510.

Slice-based schemes in which the MB_skip_mode_type is set in a slice header of an enhanced layer frame have been described above. Hereinafter, a macro-block-based scheme according to another exemplary embodiment, in which the MB_skip_mode_type is set in a header of a macro-block constituting the slice, will be briefly described.

According to this scheme, the type of the macro-block skip mode can be set as one of three types including 0, 1, and 2. When the type of the extended macro-block skip mode is 0, the skip mode is not used for the macro-block of the enhanced layer frame (No skip mode). When the type of the extended macro-block skip mode is 1, the Base_mode_flag has a value of 0 as shown in table 510 of FIG. 5, and the macro-block of the enhanced layer is skipped while the information of the base layer is never used.

When the type of the extended macro-block skip mode is 2, the Base_mode_flag has a value of 1 as shown in table 520 of FIG. 5 and all information of the base layer is used. Therefore, only the flag is set to 1 and transmitted to the decoder without encoding any other information about a corresponding macro-block to be encoded.

Figure 4:
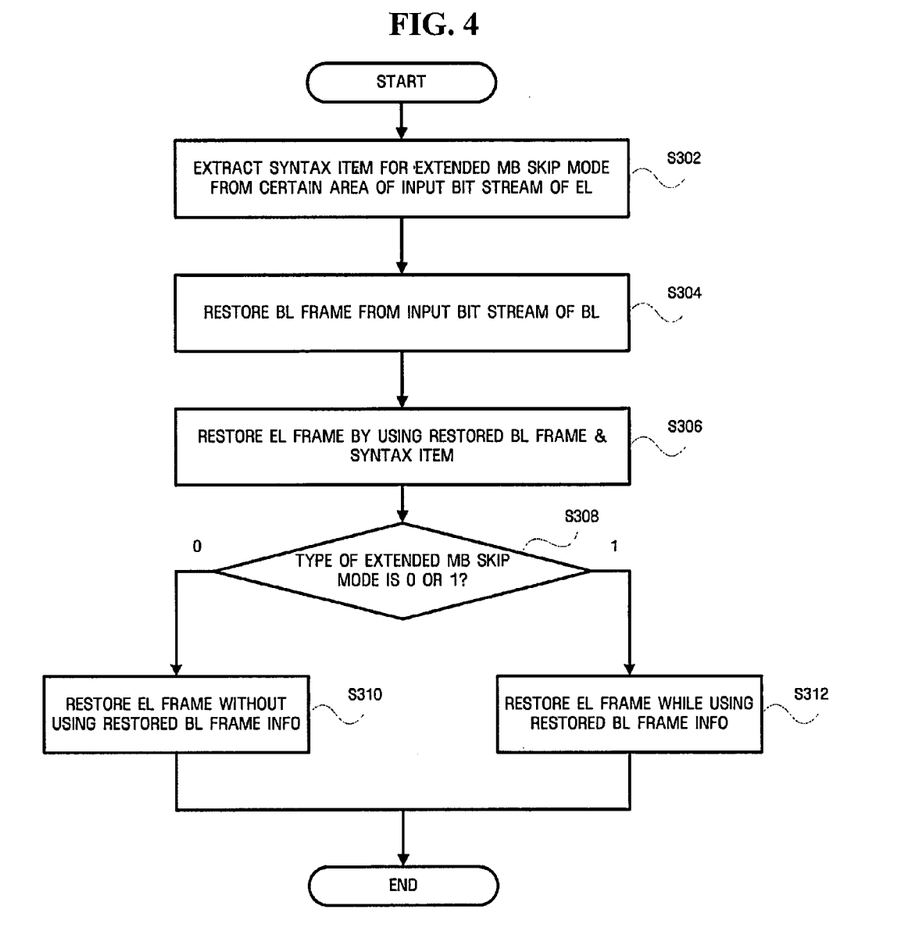
FIG. 4 is a flowchart illustrating the entire process of a decoding method using an extended macro-block skip mode according to an exemplary embodiment of the present invention.

Hereinafter, a process for receiving and restoring a bit stream having been generated through the above-mentioned process will be described. FIG. 4 is a flowchart illustrating the entire process of a decoding method using an extended macro-block skip mode according to an exemplary embodiment of the present invention.

First, a syntax item for an extended macro-block skip mode, which indicates whether to skip an enhanced layer frame in an encoding process, is extracted from a predetermined area of a bit stream of the enhanced layer input to the decoder (operation S302). Such an extraction process corresponds to a process of identifying the type of the extended macro-block skip mode set in the area by parsing the bit stream of the enhanced layer. The structure of the bit stream will be described later with reference to FIG. 7.

After identifying the type, a frame of the base layer is restored from the bit stream input to the base layer (operation S304), and the enhanced layer frame is then restored by using the extended macro-block skip mode of the extracted syntax item and the restored base layer frame (operation S306). The restoration of the base layer and enhanced layer as described above is known in the related art multi-layer video signal restoration technology and will not be further described.

Meanwhile, in extracting the syntax item in operation S302, the type of the extended macro-block skip mode has been set to 0 or 1 in the header area of the slice of the enhanced layer, as already described above. Therefore, a decoder of the enhanced layer determines if the type of the extended macro-block skip mode is 0 or 1 (operation S308), and restores the enhanced layer frame without using the information of the restored base layer frame at all when the type of the extended macro-block skip mode is 0 (operation S310). When the type of the extended macro-block skip mode is 1, the decoder of the enhanced layer restores the enhanced layer frame while using the restored base layer frame information (operation S312).

The base layer frame information includes the residual information and motion information of the restored frame of the base layer. The type of the extended macro-block skip mode can be classified into a case of using neither of the residual information and the motion information, a case of using only the residual information without the motion information, a case of using only the motion information without the residual information, and a case of using both the residual information and the motion information. Therefore, during the restoration process also, restoration would be performed according to a specific scheme for each type.

Figure 7:
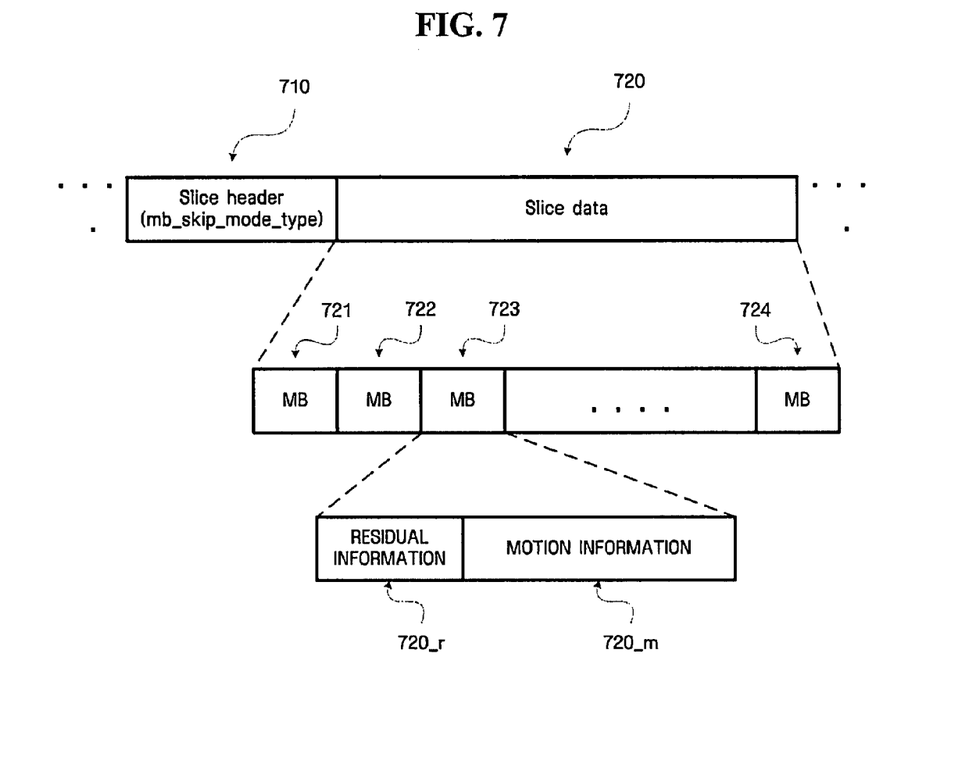
FIG. 7 illustrates a structure of a bit stream according to an exemplary embodiment of the present invention.

Hereinafter, a structure of a bit stream according to an exemplary embodiment will be described with reference to FIG. 7. The bit stream generated during the encoding process of the enhanced layer can be divided into a slice header 710 and slice data 720.

In the slice header area 710, information about the type of the extended macro-block skip mode, which indicates whether the base layer information is used as it is while skipping the slice of the enhanced layer, is recorded. Further, the slice data area 720 includes a plurality of Macro-block Data blocks (MBs) 721 to 724, and each MB 723 includes residual information 720_*r* and motion information 720_*m*.

Figure 8:
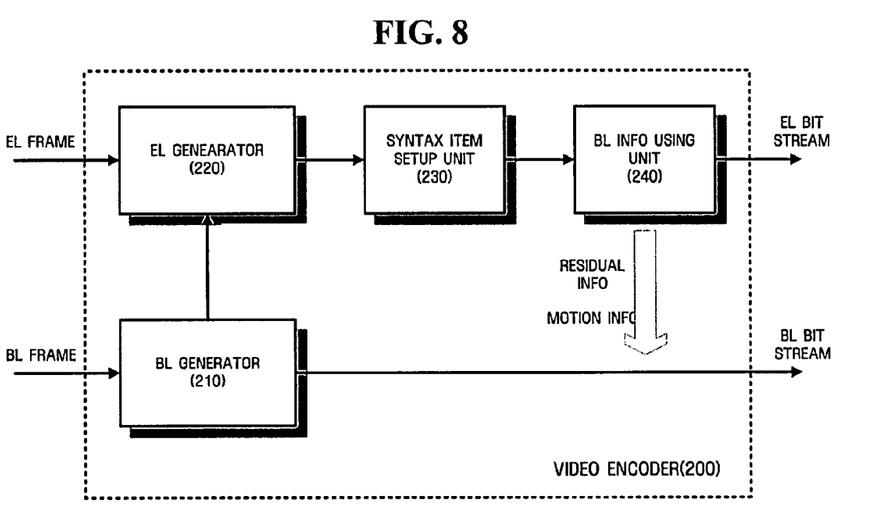
FIG. 8 is a block diagram illustrating the entire structure of an encoder using an extended macro-block skip mode according to an exemplary embodiment of the present invention.

FIG. 8 is a block diagram illustrating the entire structure of an encoder using an extended macro-block skip mode according to an exemplary embodiment of the present invention.

The encoder using an extended macro-block skip mode according to an exemplary embodiment of the present invention includes a base layer generator 210 receiving a frame of a base layer and generating a bit stream of the base layer, an enhanced layer generator 220 generating a bit stream of an enhanced layer by referring to the frame of the base layer, a syntax item setup unit 230 setting a syntax item for an extended macro-block skip mode in an area of the frame of the enhanced layer, wherein the syntax item indicates whether the base layer information is used as it is while skipping the frame, and a base layer information using unit 240 selectively using the base layer information according to the type of the extended macro-block skip mode.

The area corresponds to the header area of a slice included in the frame of the enhanced layer, and the type of the extended macro-block skip mode can be set to 0 or 1. When the type of the extended macro-block skip mode is 0, the base layer information using unit 240 skips the slice without using the base layer information. When the type of the extended macro-block skip mode is 1, the base layer information using unit 240 skips the slice and uses the base layer information. The base layer information may include residual information and motion information of a frame existing within the base layer.

Further, the type of the extended macro-block skip mode can be extended and classified into four cases, which include a case of using neither of the residual information and the motion information, a case of using only the residual information without the motion information, a case of using only the motion information without the residual information, and a case of using both the residual information and the motion information, as described above.

Figure 9:
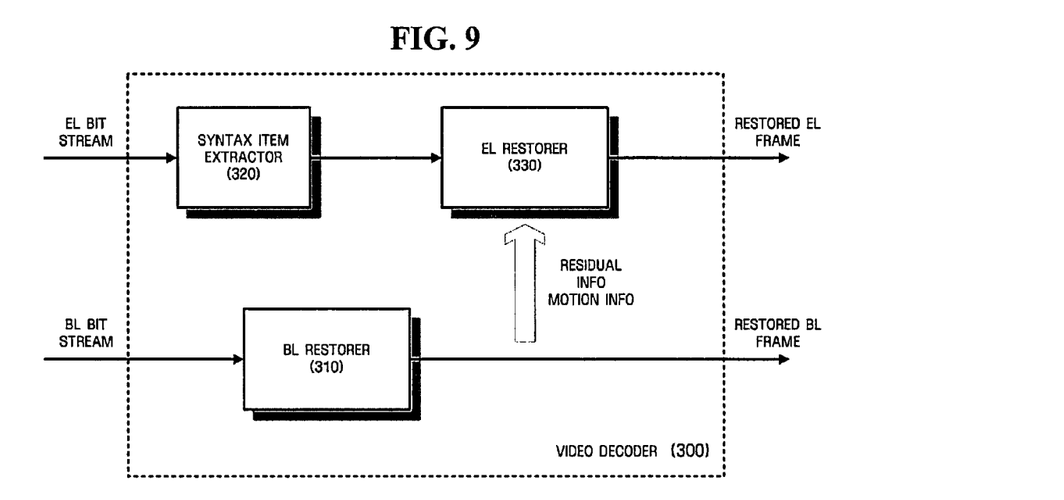
FIG. 9 is a block diagram illustrating the entire structure of a decoder using an extended macro-block skip mode according to an exemplary embodiment of the present invention.

FIG. 9 is a block diagram illustrating the entire structure of a decoder using an extended macro-block skip mode according to an exemplary embodiment of the present invention. The decoder includes a base layer restorer 310, a syntax item extractor 320, and an enhanced layer restorer 330.

The base layer restorer 310 restores a frame of the base layer from an input bit stream of the base layer. The syntax item extractor 320 extracts a syntax item for the extended macro-block skip mode from an area of an input bit stream of the enhanced layer.

The enhanced layer restorer 330 restores a frame of the enhanced layer by using the extended macro-block skip mode of the extracted syntax item and the restored frame of the base layer. The area corresponds to a header area of the slice included in the frame of the enhanced layer, and the type of the extended macro-block skip mode may be set to 0 or 1.

During the restoration process, the enhanced layer restorer 330 determines if the type of the extended macro-block skip mode is 0 or 1. Then, the enhanced layer restorer 330 restores the frame of the enhanced layer without using the information of the restored base layer frame at all when the type is 0. In contrast, when the type is 1, the enhanced layer restorer 330 restores the frame of the enhanced layer while using the information of the restored base layer frame.

As used herein, the "unit" or "module" refers to a software element or a hardware element, such as a Field Programmable Gate Array (FPGA) or an Application Specific Integrated Circuit (ASIC), which performs a predetermined function. However, the unit or module does not always have a meaning limited to software or hardware. The module may be constructed either to be stored in an addressable storage medium or to be executed one or more processors. Therefore, the module includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the modules may be either combined into a smaller number of elements or modules or divided into a larger number of elements or modules.

One skilled in the art would understand that the scope of an encoding/decoding apparatus using an extended macro-block skip mode according to the present invention as described above includes a computer-readable recoding medium on which program codes for executing the above-mentioned method in a computer are recorded.

The exemplary embodiment(s) employ a new syntax item which can re-define a macro-block skip mode in an enhanced layer of a scalable video coding. By the new syntax item, the efficiency in inter-layer prediction may be improved, which may thereby improving the screen quality of a video sequence. However, such an improvement is not necessary to realize the scope of the exemplary embodiments.

The effects of the present invention are not limited to the above-mentioned effects, and other effects not mentioned above can be clearly understood from the definitions in the claims by one skilled in the art. Or, no effects may be realized, without departing from the scope of the invention.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the exemplary embodiments described above should be understood as illustrative not restrictive in all aspects. The present invention is defined only by the scope of the appended claims and must be construed as including the meaning and scope of the claims, and all changes and modifications derived from equivalent concepts of the claims.

What is claimed is:

1. A method of encoding a multi-layer video signal by using an extended macro-block skip mode, the method comprising:
    generating a bit stream of a base layer;
    generating a bit stream of an enhanced layer by referring to a frame of the base layer;
    setting a syntax item for an extended macro-block skip mode in an area of the bit stream of the enhanced layer,
    wherein the syntax item indicates whether information of the base layer is used and a frame of the enhanced layer is skipped,
    wherein the extended macro-block skip mode is set by combination of flags indicating which information the base layer refers to, and
    wherein the flags comprise a residual prediction flag indicating whether to skip residual information, a motion flag indicating whether to skip motion information, and a base mode flag indicating general information about the base layer.

2. The method of claim 1, further comprising selectively using the information of the base layer according to a type of the extended macro-block skip mode.

3. The method of claim 2, wherein the area corresponds to a header area of a slice included in the frame of the enhanced layer and the type of the extended macro-block skip mode is set to 0 or 1.

4. The method of claim 2, wherein, in the selectively using the information of the base layer, the slice is skipped without using the information of the base layer if the type of the extended macro-block skip mode is 0, and the slice is skipped while the information of the base layer is used if the type of the extended macro-block skip mode is 1.

5. The method of claim 4, wherein the information of the base layer comprises at least one of residual information and motion information of a frame existing within the base layer.

6. The method of claim 5, wherein the type of the extended macro-block skip mode comprises one of using neither of the residual information and the motion information, using only the residual information without the motion information, using only the motion information without the residual information, and using the residual information and the motion information.

7. The method of claim 2, wherein the area corresponds to a header area of a macro-block included in the frame of the enhanced layer, and the type of the extended macro-block skip mode is set to one of 0, 1, and 2.

8. The method of claim 7, wherein, in the selectively using the information of the base layer, the macro-block in the frame of the enhanced layer is not skipped if the type of the extended macro-block skip mode is 0, the macro-block is skipped without using the information of the base layer if the type of the extended macro-block skip mode is 1, and the macro-block is skipped while using the information of the base layer if the type of the extended macro-block skip mode is 2.

9. The method of claim 8, wherein the information of the base layer comprises at least one of residual information and motion information of a frame existing within the base layer.

10. A non-transitory computer-readable recording medium including with computer-readable instruction codes for executing the method of claim 1 in a computer.

11. A method of decoding a multi-layer video signal by using an extended macro-block skip mode, the method comprising:

extracting a syntax item for an extended macro-block skip mode from an area of an input enhanced layer bit stream;

restoring a frame of a base layer from an input base layer bit stream;

restoring a frame of an enhanced layer by using the restored frame of the base layer and the extracted syntax item, wherein the syntax item indicates whether information of the base layer is used and whether the frame of the enhanced layer was skipped during an encoding process, and wherein the extended macro-block skip mode is set by combination of flags indicating which information the base layer refers to, wherein the flags comprise a residual prediction flag indicating whether to skip residual information, a motion flag indicating whether to skip motion information, and a base mode flag indicating general information about the base layer.

12. The method of claim 11, wherein the area corresponds to a header area of a slice included in the frame of the enhanced layer, and a type of the extended macro-block skip mode is set to one of 0 and 1.

13. The method of claim 12, wherein the restoring a frame of the enhanced layer comprises:

determining whether the type of the extended macro-block skip mode is 0 or 1;

restoring the frame of the enhanced layer without using information of the restored frame of the base layer if the type of the extended macro-block skip mode is 0; and restoring the frame of the enhanced layer while using the information of the restored frame of the base layer if the type of the extended macro-block skip mode is 1.

14. The method of claim 13, wherein the information of the base layer comprises at least one of residual information and motion information of the restored frame of the base layer.

15. The method of claim 14, wherein the type of the extended macro-block skip mode comprises one of using neither of the residual information and the motion information, a case of using only the residual information without the motion information, using only the motion information without the residual information, and using both the residual information and the motion information.

16. A non-transitory computer-readable recording medium including computer-readable codes for executing the method of claim 11 in a computer.

17. An encoder for encoding a multi-layer video signal by using an extended macro-block skip mode, the encoder comprising:

a base layer generator which generates a bit stream of a base layer;

an enhanced layer generator which generates a bit stream of an enhanced layer by referring to a frame of the base layer;

a syntax item setup unit which sets a syntax item for an extended macro-block skip mode in an area of the bit stream of the enhanced layer, wherein the syntax item indicates whether information of the base layer is used and a frame of the enhanced layer is skipped, wherein the extended macro-block skip mode is set by combination of flags indicating which information the base layer refers to, wherein the flags comprise a residual prediction flag indicating whether to skip residual information, a motion flag indicating whether to skip motion information, and a base mode flag indicating general information about the base layer, and wherein at least one of the base layer generator, the enhanced layer generator, and the syntax item setup unit is a hardware component.

18. The encoder of claim 17, further comprising a base layer information using unit which selectively uses the information of the base layer according to a type of the extended macro-block skip mode.

19. The encoder of claim 18, wherein the area corresponds to a header area of a slice included in the frame of the enhanced layer and the type of the extended macro-block skip mode is set to one of 0 and 1.

20. The encoder of claim 19, wherein the base layer information using unit skips the slice without using the information of the base layer if the type of the extended macro-block skip mode is 0, and skips the slice while using the information of the base layer if the type of the extended macro-block skip mode is 1.

21. The encoder of claim 20, wherein the information of the base layer comprises at least one of residual information and motion information of a frame existing within the base layer.

22. The encoder of claim 21, wherein the type of the extended macro-block skip mode comprises one of using neither of the residual information and the motion information, using only the residual information without the motion information, using only the motion information without the residual information, and using the residual information and the motion information.

23. The encoder of claim 18, wherein the area corresponds to a header area of a macro-block included in the frame of the enhanced layer and a type of the extended macro-block skip mode is set to one of 0, 1, and 2.

24. The encoder of claim 23, wherein the base layer information using unit does not skip the macro-block in the frame of the enhanced layer if the type of the extended macro-block skip mode is 0, the base layer information using unit skips the macro-block without using the information of the base layer if the type of the extended macro-block skip mode is 1, and the base layer information using unit skips the macro-block while using the information of the base layer if the type of the extended macro-block skip mode is 2.

25. The encoder of claim 24, wherein the information of the base layer comprises at least one of residual information and motion information of a frame existing within the base layer.

26. A decoder that is configured to decode a multi-layer video signal by using an extended macro-block skip mode, the decoder comprising:
   a syntax item extractor which extracts a syntax item for an extended macro-block skip mode from an area of an input enhanced layer bit stream;
   a base layer restorer which restores a frame of the base layer from an input base layer bit stream;
   an enhanced layer restorer which restores a frame of the enhanced layer by using the restored frame of the base layer and the extracted syntax item,
   wherein the syntax item indicates whether information of the base layer is used and whether the frame of the enhanced layer has been skipped during encoding,
   wherein the extended macro-block skip mode is set by combination of flags indicating which information the base layer refers to,
   wherein the flags comprise a residual prediction flag indicating whether to skip residual information, a motion flag indicating whether to skip motion information, and a base mode flag indicating general information about the base layer, and
   wherein at least one of the syntax item extractor, the base layer restorer, and the enhanced layer restorer is a hardware component.

27. The decoder of claim 26, wherein the area corresponds to a header area of a slice included in the frame of the enhanced layer and a type of the extended macro-block skip mode is set to one of 0 and 1.

28. The decoder of claim 27, wherein the enhanced layer restorer determines whether the type of the extended macro-block skip mode is 0 or 1, restores the frame of the enhanced layer without using information of the restored frame of the base layer if the type of the extended macro-block skip mode is 0, and restores the frame of the enhanced layer while using the information of the restored frame of the base layer if the type of the extended macro-block skip mode is 1.

29. The decoder of claim 28, wherein the information of the base layer comprises at least one of residual information and motion information of the restored frame of the base layer.

30. The decoder of claim 29, wherein the type of the extended macro-block skip mode comprises one of using neither of the residual information and the motion information, using only the residual information without the motion information, using only the motion information without the residual information, and using both the residual information and the motion information.

31. A non-transitory computer readable recording medium having stored thereon a bit stream processed by a computer, the bit stream having a construction of an enhanced layer of a frame, the construction comprising:
   a slice header area comprising information about a type of an extended macro-block skip mode, which indicates to the computer if information of a base layer is used and a frame of the enhanced layer is skipped; and
   a slice data area comprising at least one of residual information and motion information of a frame of the base layer,
   wherein the slice header area and the slice data area are included in the frame of the enhanced layer, and
   wherein the extended macro-block skip mode is set by combination of flags indicating which information the base layer refers to, and
   wherein the flags comprise a residual prediction flag indicating whether to skip residual information, a motion flag indicating whether to skip motion information, and a base mode flag indicating general information about the base layer.

* * * * *